(12) United States Patent
Robinson

(10) Patent No.: US 6,324,967 B1
(45) Date of Patent: Dec. 4, 2001

(54) BEVERAGE MAKER

(75) Inventor: Thomas Robinson, Pembrokeshire (GB)

(73) Assignee: Windmill Holdings Limited, Middlebury (GB)

( * ) Notice: Subject to any disclaimer, the term of this patent is extended or adjusted under 35 U.S.C. 154(b) by 0 days.

(21) Appl. No.: 09/674,889

(22) PCT Filed: May 12, 1999

(86) PCT No.: PCT/GB99/01497

§ 371 Date: Nov. 7, 2000

§ 102(e) Date: Nov. 7, 2000

(87) PCT Pub. No.: WO99/58034

PCT Pub. Date: Nov. 18, 1999

(30) Foreign Application Priority Data

May 12, 1998 (GB) .................................................. 9810154
Jan. 19, 1999 (GB) .................................................. 9901152

(51) Int. Cl.[7] .................................................. A47J 31/20
(52) U.S. Cl. ................................................. 99/297; 99/287
(58) Field of Search ..................... 99/297, 287; 210/474, 210/477, 480, 482

(56) References Cited

U.S. PATENT DOCUMENTS

| | | | |
|---|---|---|---|
| 161,640 | * 4/1875 | Smith ....................................... | 99/297 |
| 2,935,928 | 5/1960 | Keating et al. ......................... | 99/297 |
| 3,307,474 | 3/1967 | Kasher . | |
| 4,365,544 | 12/1982 | Howitt ................................... | 99/297 |
| 5,770,074 | * 6/1998 | Pugh ................................... | 99/297 X |

FOREIGN PATENT DOCUMENTS

| | | |
|---|---|---|
| 74757 | 5/1893 | (DE) . |
| 2647467 | 4/1978 | (DE) . |
| 0032850 A1 | 7/1981 | (EP) . |
| 0032850 B1 | 7/1981 | (EP) . |
| 1311136 | 1/1962 | (FR) . |
| 2300532 | 2/1975 | (FR) . |
| 12198 | 9/1848 | (GB) . |

* cited by examiner

*Primary Examiner*—Reginald L. Alexander
(74) *Attorney, Agent, or Firm*—Clifford W. Browning; Woodard, Emhardt, Naughton, Moriarty & McNett

(57) ABSTRACT

A coffee maker includes an open topped jug which is a plastics molding. It has a lid which carries a rotary cap from which a leadscrew depends. The leadscrew has a four start thread. A nut member is screw-fitted onto the leadscrew and is part of a one-piece plastics molding which carries and supports an annular separator disc which is heat formed from a thin plastics mesh material. The separator disc comprises a major planar portion and a flared circumferential portion which presents an annular concave surface to the base of the jug. A rod depends from the lid and is a sliding fit in an aperture in the planar portion of the separator disc. The separator disc is driven towards the base by turning the rotary cap and the leadscrew with it. The rod prevents the separator disc from rotating with the leadscrew.

21 Claims, 2 Drawing Sheets

BEVERAGE MAKER

This invention relates to a beverage maker of the kind which comprises a cylindrical chamber having a closed end, a pouring spout spaced from the closed end and a separator piston disc which is slidable within the cylindrical chamber between the pouring spout and the closed end, the separator piston disc being permeable to water and the beverage whilst being impenetrable to solid raw material from which the beverage is made and being adapted to be driven towards the closed end of the cylindrical chamber, the arrangement being such that the solid raw material, which is usually in a granular form, is placed in the cylindrical chamber between the closed end and the separator piston disc and the cylindrical chamber is filled with hot water which interacts with raw material to form the beverage, the separator piston disc being driven towards the closed end to separate the residue of the raw material from the resultant beverage. Such a beverage maker is referred to in the rest of this description as "a beverage maker of the kind referred to". More particularly, although not exclusively, this invention relates to a coffee maker.

When the cylindrical chamber of a coffee maker is first charged with coffee and hot water to make coffee, the coffee maker is left standing with the separator piston disc at the end of its travel remote from the closed end of the of the cylindrical chamber for a time sufficient to allow the coffee to brew. If the cylindrical chamber is the interior of a jug which has a lid and if the separator piston disc is the head of a piston which has a piston rod which extends through an aperture in the lid so that the separator piston disc is caused to slide either way in the cylindrical chamber by the application of a thrust applied by hand to the piston rod, the piston rod will project upwards from the lid whilst the coffee maker is standing to allow the coffee to brew. The upstanding piston rod, which is often a small diameter spindle, is liable to be knocked accidentally so that the coffee maker may be knocked over. Furthermore, of the lid simply sits on the brim of the jug and/or if there is a clearance around the piston rod in the aperture in the lid, the disc, the piston rod, and even the lid are likely to rock, so that the rod oscillates angularly relative to the axis of the jug in a random manner when the thrust is applied by hand to the piston rod, unless great care is taken to ensure that the line of action of the manually applied thrust is truly vertical and coincident with the axis of the jug and of the piston rod. Such rocking can lead to splashing of hot water or coffee from within the jug which is undesirable and could cause scalding. Also the performance of the necessary piston ring seal can be impaired if the separator piston disc is displaced from its designed orientation normal to the axis and the side walls of the jug. In an extreme situation, the user could lose control of the coffee maker so that, in reaction to a misaligned manually applied thrust, it slides in an uncontrolled manner on the table. Hence care needs to be taken to hold the jug firmly with one hand and to depress the piston so that its rod remains as near to coaxial with the jug as possible.

An object of this invention is to minimise these problems for a user of a beverage maker of the kind referred to and more particularly to relieve the user of the need to take care to keep the piston rod vertical when causing the separator piston to travel downwards within the jug.

DE-C-74 757 and FR-E-80 894 disclose beverage makers in which a screw is provided which is coupled with a separator piston disc and which is supported substantially coaxially within a cylindrical chamber for rotation about its axis relative to the cylindrical chamber so that the separator piston disc moves within the cylindrical chamber with rotation of the screw.

A preferred embodiment of this invention is a coffee maker including an open topped vessel having a base and substantially straight sides upstanding from the periphery of the base and forming the cylindrical chamber and the pouring spout, a lid for fitting to the open top whereby to enclose the interior of the vessel, the separator piston disc having a planform profile similar to that of the base, means for driving the disc downwards within the vessel to separate the residue of the coffee grains from the liquid, the disc being provided with a seal around its periphery, the seal being operably cooperative with the sides of the vessel so as to seal against passage of coffee grains between the disc and the sides of the vessel from below the disc to the part of the interior of the vessel above the disc, wherein a multistart threaded screw depends from the lid by which it is supported for rotation about its axis relative to the lid, a component is fixed to the upper end of the screw and is accessible from above the lid so that it can by turned whereby to turn the screw about its axis, and the disc is formed as a nut which is in screwthreaded engagement with the screw so that it rises or descends within the vessel with rotation of the screw, there being means operable to hold the disc against rotation with rotation of the screw.

Preferably the screw has a two start or a four start thread.

The lid, which would be removable, may be releasably fixed to the top of the vessel.

The seal could be a circumferentially-continuous lip seal arranged with its annular recess facing the base of the vessel.

The separator piston disc could be a moulding, one or more portions of which comprise a mesh which is incorporated in structure of the remainder of the disc during molding. The seal and the disc, including the mesh portion or portions incorporated therein, could be formed in a single mould, the molding process being a two shot process, one shot moulding the disc with the mesh portion or portions therein and the other shot moulding the seal.

Occasionally the piston of a coffee maker which is a beverage maker of the kind referred to, locks in mid-stroke whilst it is being driven down towards the closed end of the cylindrical chamber. This is due to a concentration of coffee grounds building up under the piston ring seal and acting as a wedge between the piston ring seal and the cylindrical wall along which is slides, to impede further downwards movement of the piston. This is acknowledged by purveyors of conventional coffee makers of this type who provide instructions for dealing with this problem, those instructions being for the user to stop urging the piston down, to lift it slightly to enable release of the build up of coffee grounds and then to continue pushing the piston down. FR-A-2 300 532 discloses a filter for a beverage maker of the kind to which this invention relates which would also be vulnerable to this problem.

The problem of build up of coffee grounds does not arise with a lip seal which is a circumferentially continuous lip seal of a soft plastics material because it wipes the inner surface of the sides of the vessel as the disc is driven downwards. However, if the vessel is formed as a plastics moulding so that the sides of its interior taper from top to bottom as is customary with plastics mouldings for moulding reasons, it is difficult to ensure that the lip seal adequately seals at the top of the vessel without the friction between the soft material of the seal and the side of the vessel becoming excessive as the piston descends towards the base.

According to another aspect of this invention there is provided a separator piston disc and peripheral ring seal for a beverage maker of the kind referred to which is a one-piece mesh disc having a major planar portion and a flared circumferentially extending peripheral portion which serves as the peripheral ring seal portion, the arrangement being such that, when the one-piece mesh disc is fitted into a beverage maker of the kind referred to, its peripheral edge is in sliding contact with the inner surface of the cylindrical wall and is displaced axially with respect to the major planar portion, being nearer to the base of the cylindrical chamber than is that major planar portion.

Preferably the major planar portion has a central aperture in which a nut member is fitted for engagement with the screw of the aforesaid preferred embodiment of coffee maker. The major portion of the one-piece mesh disc may be reinforced by radial ribs which project from the nut member over the face of the major planar portion which is further from the peripheral edge.

Further, if in order to hold the disc against rotation with rotation of the screw, the vessel and the disc have a non-circular cross-section or a projection from the inner wall of the vessel is provided which projects into the soft material of the lip seal, there is a tendency for the disc to rotate relative to the vessel, a leading portion of the soft plastic material of the lip seal tending to compress whilst a trailing portion tends to be separated from the vessel sufficiently for there to be leakage of coffee grains between the seal and the vessel wall which would not be satisfactory.

Two forms of coffee maker in which this invention is embodied and a modification of one of them are described now by way of example with reference to the accompanying drawings, of which:

Figure 1:
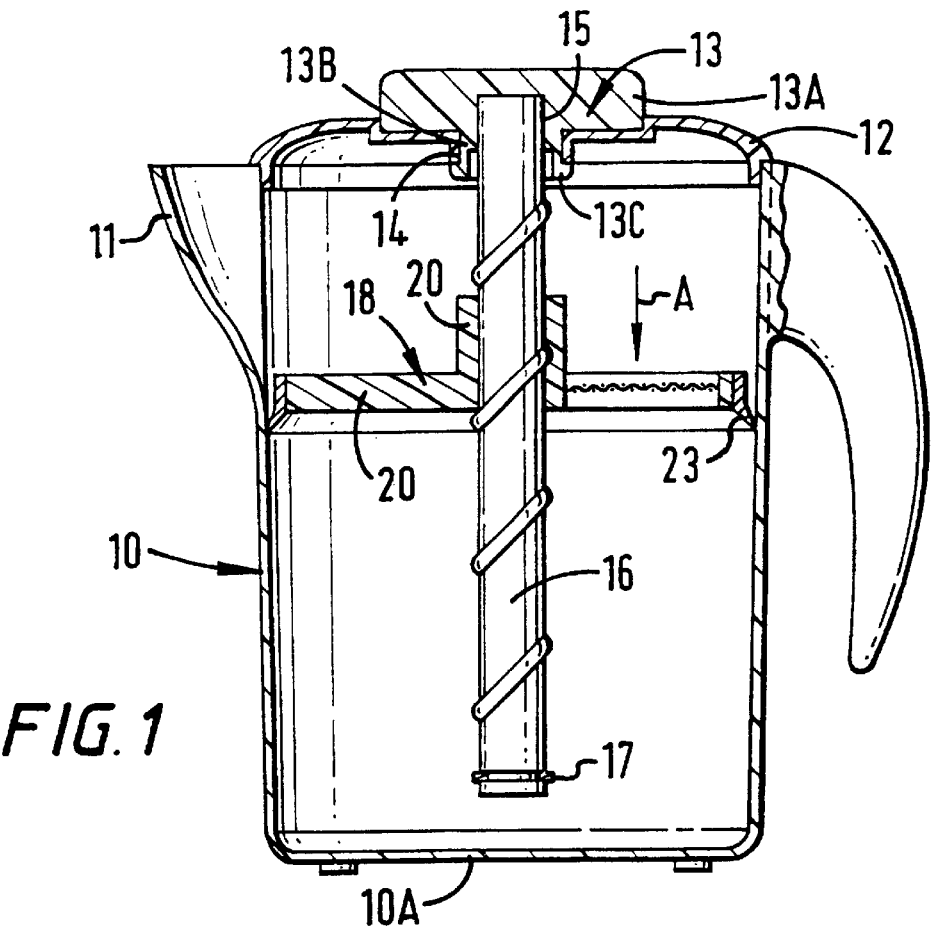
FIG. 1 is a schematic illustration in transverse section of one of the coffee makers.

FIG. 1 shows that the coffee maker comprises a hollow vessel 10 in the form of an open topped jug having a pouring spout 11 and which is closed at its upper end by a lid 12 which is realisably fixed to the brim of the jug. The lid 12 is annular and is formed by moulding. The interior of the vessel 10 is a substantially cylindrical chamber.

A rotary cap 13 has an upper portion 13A which has an outside diameter greater than the diameter of the central aperture 14 of the lid 12 and a depending cylindrical boss 13B which is spigotted into that central aperture 14. The cylindrical boss 13B is formed at its lower end with a circumferentially continuous rib 13C which is snap fitted through the central aperture 14 of the annular lid 12 whereby the rotary cap 13 is retained against axial displacement relative to the lid 12 but can be rotated relative to the lid 12. A socket 15 is formed substantially coaxially in the rotary cap 13, the socket 15 opening downwardly. The rotary cap 13 is formed by moulding.

A two start thread leadscrew 16 is spigotted into the socket 15 of the rotary cap 13 and depends therefrom through the centre of the cylindrical chamber of the vessel 10 so that its lower end is close to the base 10A of the vessel 10. The thread is formed on the exterior surface of the leadscrew 16 and the latter is formed by moulding. Indeed the rotary cap and the leadscrew could be moulded as a one-piece component. The lower end of the leadscrew 16 carries a circlip 17 and may be located relative to the base 10A by an upstanding projection (not shown) which is formed integrally with the base 10A and which seats in a hole that is formed in the bottom of the leadscrew 16.

Figure 2:
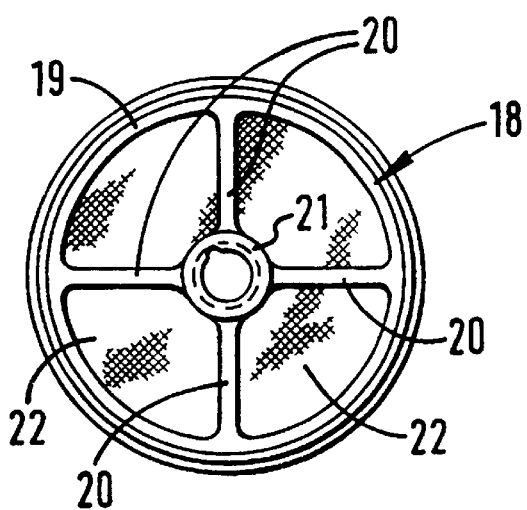
FIG. 2 is a view on arrow A in FIG. 1 of a component of the coffee maker.

A piston disc 18 is screw fitted onto the leadscrew 16 in the manner of a nut. The disc 18 is a one piece moulding. FIG. 2 shows that the disc 18 comprises an annular peripheral portion 19 with four mutually perpendicular radial rib portions 20 and a central ring portion 21, there being integral mesh portions 22 spanning the apertures bounded by each adjacent pair of the rib portions 20 and the arcuate part of the peripheral portion 19 that joins the outer ends of the rib portions 20. The radial rib portions 20 provide reinforcement. The mesh portions 22 are formed of a woven fabric which is incorporated automatically in the moulded disc 18 during the moulding step by which the latter is formed. The central ring portion 21 has a thread formed in its central aperture, that being the thread which engages the thread of the leadscrew 16.

A moulded lip seal 23, which is formed of a soft sealing material, that is to say a plastics material which is softer than the material from which the peripheral portion 19, the radial rib portions 20 and the central ring portion 21 of the disc 18 are moulded, is fitted around the radially outer periphery of the disc 18. The lip seal 23 is formed by the second shot of a two shot moulding process which is performed in a single mould, the first shot being the formation of the disc 18. The lip seal 23 is a circumferentially continuous ring. The annular arcuate recess that is formed by the lip seal 23 faces the base 10A of the vessel 10.

In order to charge the coffee maker for use, the lid 12, the rotary cap 13, the leadscrew 16 and the piston disc 18 are removed from the vessel 10. Coffee grains are introduced into the vessel 10 through the open top. The vessel 10 is filled with water to just below the spout. The lid 12, rotary cap 13, leadscrew 16 and piston disc 18 are refitted with the piston disc 18 adjacent the lid 12. When the coffee is brewed and ready to drink, the user rotates the upper portion 13A of the rotary cap 13 manually thereby rotating the leadscrew 16 and driving the piston disc 18 down towards the base 10A of the vessel 10 whereby to separate the residue of the coffee grains from the liquid, liquid coffee being allowed to pass through the interstices of the mesh portions 22 of the piston disc 18 during travel of the piston disc 18. The circlip 17 limits downwards travel of the piston disc 18 and ensures that the latter is removed from the vessel 10 with the leadscrew 16 for charging and cleaning.

Use of a multi-start thread, especially a two start thread gives a larger displacement of the piston disc 18 for rotation of the cap 13 than would be achieved by a single start thread. It also helps to overcome resistance to movement of the piston disc 18 due to friction of the lip seal 23 on the sides of the vessel 10 and gives a more even distribution of load around the leadscrew so that the action of the mechanism is smooth. The circumferentially continuous lip seal 23 is intended to provide a circumferentially continuous barrier to the passage of coffee grains between the periphery of the piston disc 18 and the inner wall of the vessel 10. The piston disc 18 contributes to the location of the leadscrew 16 within the vessel 10.

Figure 3:
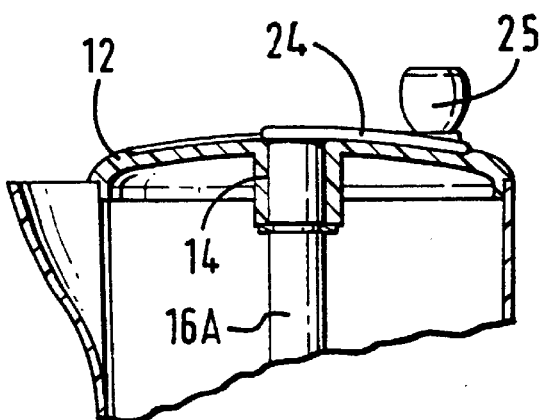
FIG. 3 is a fragmentary schematic illustration of the upper part of a modified coffee maker, the modification being to the rotary cap.

FIG. 3 shows that the rotary cap could be replaced by an arm 24 which is fixed to the top of the leadscrew 16A that projects up through the central aperture 14 of the lid 12. The arm 24 may have a rotary knob 25 at its outer end. Alternatively the rotary cap 13 may be provided with such an arm which may be hinged to the cap so that it can be folded and stowed within the planform area of the upper portion 13A of the cap 13 and folded out only when it is needed to turn the leadscrew 16.

Rotation of the leadscrew 16 could be powered either mechanically or electrically as an alternative to the manual operation described above.

The annular lid could be simply seated on the brim of the vessel 10 rather than being realisably fixed thereto as described above. The vessel 10 could be circular in cross-section in which case provision should be made to constrain the piston disc 18 from rotating with the leadscrew 16. The vessel 10 could be made of glass. The leadscrew could be machined from stainless steel. The mesh portions of the piston disc could comprise a series of circular holes for strength reasons.

Figure 4:
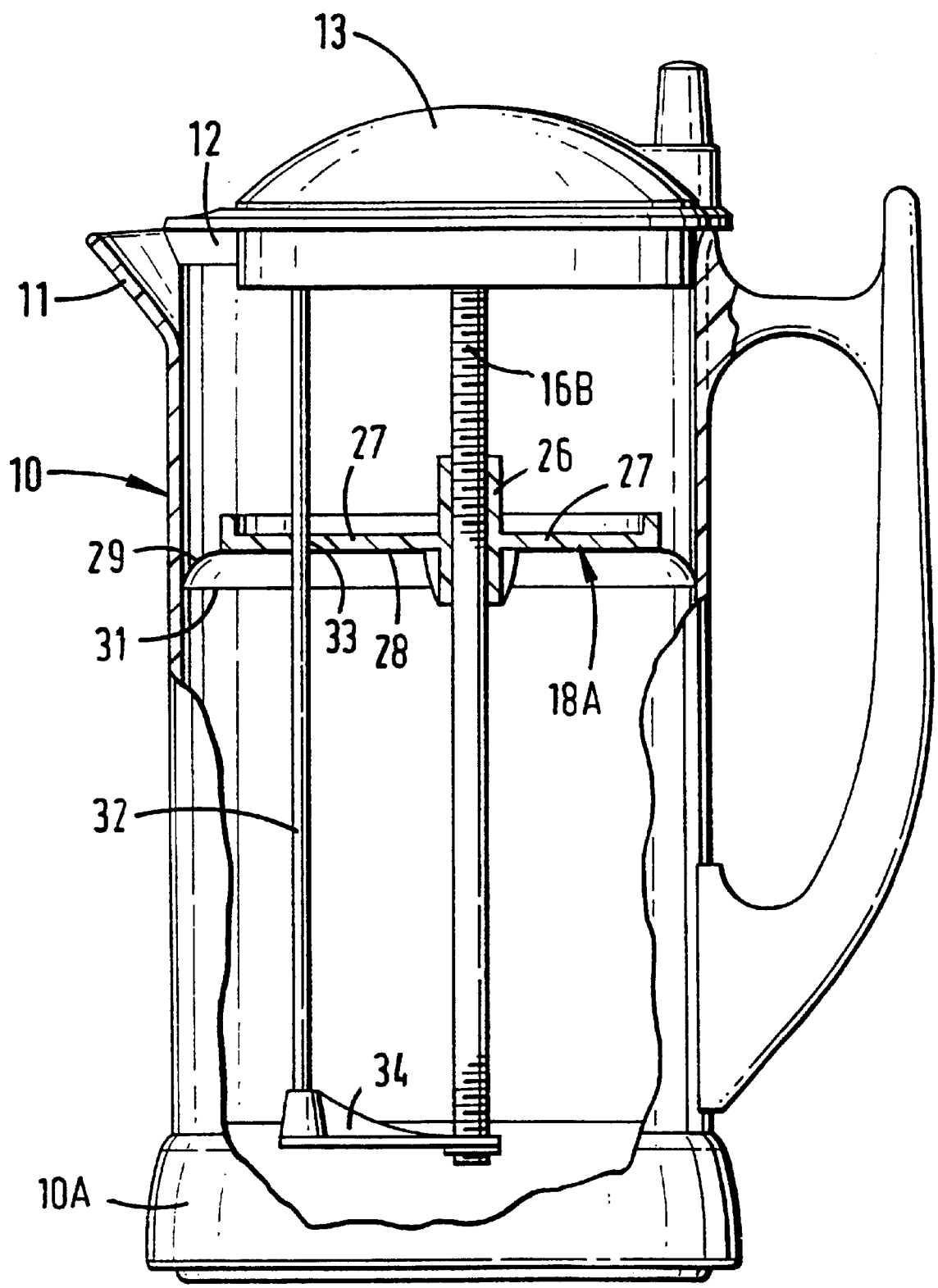
FIG. 4 is a view similar to FIG. 1 of the other coffee maker.

FIG. 4 shows another form of coffee maker in which this invention is embodied. Parts of the coffee maker shown in FIG. 4 which are similar to corresponding parts of the coffee maker shown in FIGS. 1 and 2 are identified by the same reference numeral.

The vessel 10 is formed by moulding. As is usual with such moulded products, the side walls of the vessel 10 taper slightly towards the base of the vessel 10. It may be circular or non-circular in cross-section.

The leadscrew 16B has a four-start thread. As an alternative to being formed by moulding. The leadscrew 16B could be produced by selecting a length of bar having a cross-section which is substantially square with shallow concave faces and by twisting that length of bar to form it into the leadscrew 16B.

A nut member 26 is screw-fitted onto the lead screw 16B. The nut member 26 is formed as part of a one-piece plastics moulding which also includes a number of radially extending ribs 27 of which two are shown in FIG. 4. The lower portion of the nut member 26 extends through the central aperture of an annular separator piston disc 18A so that the ribs 27 extend over the upper surface of a central planar portion 28 of the piston disc 18A. The planar portion 28 is a major portion of the piston disc 18A. The remainder of the piston disc 18A comprises a flared circumferentially extending peripheral portion 29. The flared peripheral portion 29 presents an annular concave surface to the base 16A and has a peripheral edge 31 which is nearer to the base 10A than is the major planar portion 18. The radial ribs 27 provide reinforcement for the major planar portion 28.

The annular separator disc 18A is heat formed from a thin plastics mesh material. The mesh material of the separator disc 18A is cut from a sheet of such thin mesh material before it is heat formed into the disc 18A. The cut edges would have been frayed edges, comprising circumferentially spaced strands of the plastics material of the mesh. Those frayed edges are tidied up during the heat forming process, individual strands of the plastic material being fused together one to another but the resultant edges will still be frayed rather than being formed into a circumferentially continuous hoop. The mesh is joined to the nut member 26 at the edge of the central aperture as well as to the undersides of the ribs 27. It may be so joined as part of the moulding process by which the nut member 26 with its ribs 27 was formed. Alternatively it may be so joined by bonding. In another embodiment the mesh may be clamped to the undersides of the ribs 27 by similar ribs below the mesh.

A rod 32 depends from the lid 12 substantially parallel to the leadscrew 16B and to one side of the leadscrew 16B partway between the leadscrew 16B and the side of the vessel 10. The rod 32 is a sliding fit in an aperture 33 which extends through one of the ribs 27 and the planar portion 28 of the mesh material separator disc 18A. A link 34 is joined at one end to the bottom of the rod 32. The lower end of the leadscrew 16B is journalled in the link 34. If the cross-section of the vessel 10 is not circular, the rod 32 ensures that the lid 12 and the annular separator piston 18A are aligned one with another for insertion into the vessel.

The link 34 limits downwards travel of the piston disc 18A and ensures that the latter is removed from the vessel 10 with the lead screw 16B for charging and cleaning.

The rod 32 constrains the piston 18A from turning with the leadscrew 16B. Use of a multi-start thread, especially a four-start thread, in addition to giving a larger displacement of the piston disc 18A for rotation of the cap 13 than would be achieved by a single start thread, gives a more even distribution of load around the leadscrew 16B so that the action of the mechanism is smooth. The fabric nature of the mesh material of the peripheral portion 29 of the annular separator piston 18A and its frayed edge 31 cater for the taper of the interior of the vessel 10. Because of the fabric nature of the mesh material and the frayed edge 31, the peripheral portion 29 readily conforms to the inner surface of the sides of the vessel 10 against which it is held by the pressure of the mixture of undissolved coffee grains and liquid as it is slid along the inner surface of the vessel 10 towards the base 10A with movement of the piston disc 18A towards the base 10A. The fact that the peripheral portion 29 is circumferentially continuous ensures that it provides a circumferentially continuous barrier to the passage of coffee grains between it and the inner wall of the vessel 10. The diameter of the frayed edge 31 is sufficient to ensure contact between the peripheral portion 29 and the inner surface of the sides of the vessel 10 at the top of the travel of the piston disc 18A. Hence that contact will increase with movement of the piston disc 18A towards the base 10A.

The annular separator piston disc 18A could be formed from an appropriate thin woven metal mesh rather than from the thin plastics mesh material described above.

What is claimed is:

1. A beverage maker including a cylindrical chamber having a closed end, a pouring spout and a separator piston disc which is slidable within the cylindrical chamber, the separator piston disc being permeable to water and the beverage whilst being impenetrable to solid raw material from which the beverage is made, the arrangement being such that the solid raw material is placed in the cylindrical chamber and the cylindrical chamber is filled with hot water which interacts with raw material to form the beverage, there being a screw which is coupled with the separator piston disc and which is supported substantially coaxially within the cylindrical chamber for rotation about its axis relative to the cylindrical chamber so that the separator piston disc moves within the cylindrical chamber with rotation of the screw and means operable to turn the screw whereby the separator piston disc is driven within the cylindrical chamber to separate the residue of the raw material from the resultant beverage, wherein the pouring spout is spaced from the closed end, the separator piston disc is slidable within the cylindrical chamber between the pouring spout and the closed end and is adapted to be driven towards the closed end, the solid raw material being placed in the cylindrical chamber between the closed end and the separator piston disc, and the screw has a multistart thread.

2. A beverage maker according to claim 1, wherein the means operable to turn the screw are manually operable.

3. A beverage maker according to claim 1, wherein the means operable to turn the screw are mechanical.

4. A beverage maker according to claim 1 which is a coffee maker including an open topped vessel having a base and substantially straight sides upstanding from the periphery of the base and forming the cylindrical chamber and the pouring spout, a lid for fitting to the open top whereby to enclose the interior of the vessel, the separator piston disc having a planform profile similar to that of the base, means for driving the disc downwards within the vessel to separate the residue of the coffee grains from the liquid, the disc being provided with a seal around its periphery, the seal being operably co-operative with the sides of the vessel so as to seal against the passage of coffee grains between the disc and the sides of the vessel from below the disc to the part of the interior of the vessel above the disc, wherein the screw depends from the lid by which it is supported for rotation about its axis relative to the lid, the means operable to turn the screw being a component which is fixed to the upper end of the screw and which is accessible from the lid so that it can be turned whereby to turn the screw about its axis, and the disc being formed as a nut which is in screwthreaded engagement with the screw so that it rises and descends within the vessel with rotation of the screw, there being means operable to hold the disc against rotation with rotation of the screw.

5. A beverage maker according to claim 1, wherein the screw has a two-start thread.

6. A beverage maker according to claim 1, wherein the screw has a four-start thread.

7. A beverage maker according to claim 1, wherein the lid is removable and is releasably fixed to the top of the vessel.

8. A beverage maker according to claim 4, wherein the peripheral seal with which the disc is provided is a circumferentially continuous lip seal of a soft plastics material which is arranged with its annular recess facing the base of the vessel.

9. A beverage maker according to claim 8, wherein the separator piston disc is a moulding including a mesh which is incorporated in structure of the remainder of the disc during moulding.

10. A beverage maker according to claim 4, wherein the separator piston disc peripheral seal is a one-piece mesh disc having an inner major planar portion and a flared circumferentially extending peripheral portion which serves as the peripheral ring seal portion, the arrangement being such that its peripheral edge is in sliding contact with the inner surface of the cylindrical wall and is displaced axially with respect to the major planar portion, being nearer to the base of the cylindrical chamber than is that major planar portion.

11. A beverage maker according to claim 10, wherein the major planar portion has a central aperture in which a nut member is fitted for engagement with the screw.

12. A beverage maker according to claim 11, wherein the major planar portion of the one-piece mesh disc is reinforced by radial ribs which project from the nut member over the face of the major planar portion which is further from the peripheral edge.

13. A beverage maker according to claim 4, wherein an elongate member depends from the lid through an aperture in the disc substantially parallel to the screw, the lower end of the elongate member being linked to the screw and the elongate member being a sliding fit in the aperture in the disc.

14. A beverage maker which includes a chamber having a closed end, a pouring spout spaced from the closed end and a separator piston disc which is provided with a seal around its periphery and which is slidable within the chamber between the pouring spout and the closed end, the separator piston disc being permeable to water and the beverage whilst being impenetrable to solid raw material from which the beverage is made and being adapted to be driven towards the closed end of the chamber, the seal being operable co-operative with the sides of the chamber so as to seal against passage of the raw material between the disc and the sides of the chamber from below the disc, the arrangement being such that the solid raw material is placed in the chamber between the closed end and the separator piston disc and the chamber is filled with hot water which interacts with raw material to form the beverage, the separator piston disc being driven towards the closed end to separate the residue of the raw material from the resultant beverage, wherein the separator piston disc and the peripheral ring seal are formed as a one-piece mesh disc having a major portion and a flared circumferentially extending peripheral portion which serves as the peripheral ring seal portion, the peripheral edge of the one-piece mesh disc being is sliding contact with the inner surface of the chamber wall and being displaced axially with respect to the major planar portion so that it is nearer to the base of the chamber than is that major planar portion.

15. A beverage maker according to claim 14, wherein the major planar portion of the one-piece mesh disc is reinforced by radial spokes which project over the face of the major planar portion which is further from the peripheral edge.

16. A beverage maker according to claim 14, wherein the one-piece mesh disc is heat formed from plastics mesh material.

17. A beverage maker according to claim 14, wherein the peripheral edge of the one-piece mesh disc is frayed.

18. A beverage maker according to claim 14, wherein the mesh material of the flared circumferentially extending peripheral portion and its peripheral edge has a fabric nature whereby it readily conforms to the inner surface of the sides of the chamber as it is driven towards the closed end to separate the residue of the raw material from the resultant beverage.

19. A separator piston disc and peripheral ring seal for slidably fitting in a cylindrical chamber of a beverage maker, the disc and peripheral ring seal having a major planar portion which incorporates mesh material and a flared circumferentially extending peripheral portion which serves as the peripheral ring seal portion for sliding contact with the inner surface of the wall of the cylindrical chamber, wherein the piston disc and peripheral ring seal are formed together as a one-piece disc of mesh material, the arrangement being such that, when the one-piece mesh disc is fitted into the closed ended cylindrical chamber of a beverage maker, its peripheral edge is displaced axially with respect to the major planar portion, being nearer to the closed end of the cylindrical chamber than is that major planar portion.

20. A beverage maker according to claim 19, wherein the mesh material of the flared circumferentially extending peripheral portion and its peripheral edge has a fabric nature whereby it readily conforms to the inner surface of the sides of the chamber as it is driven towards the closed end to separate the residue of the raw material from the resultant beverage.

21. A beverage maker including an open topped vessel forming a generally cylindrical chamber having a closed end, a pouring spout spaced from the closed end, a lid for fitting to the open top whereby to enclose the interior of the vessel and a separator piston disc which is slidable within the cylindrical chamber between the pouring spout and the closed end, the separator piston disc having a planform profile similar to that of the base and being permeable to water and the beverage whilst being impenetrable to sold raw material from which the beverage is made, and means for driving the disc towards the closed end of the cylindrical chamber, the arrangement being such that the solid raw material is placed in the cylindrical chamber between the closed end and the separator piston disc and the cylindrical chamber is filled with hot water which interacts with raw material to form the beverage, the separator piston disc being driven towards the closed end to separate the residue of the raw material from the resultant beverage, wherein said means for driving the disc towards the closed end of the cylindrical chamber include a screw which depends from the lid by which it is supported for rotation about its axis relative to the lid, the disc being formed as a nut which is in screwthreaded engagement with the screw so that it slides within the vessel with rotation of the screw and an elongate member depends from the lid through an aperture in the disc substantially parallel to the screw, the lower end of the elongate member being a sliding fit in the aperture of the disc.

* * * * *